(12) United States Patent
Miyamoto et al.

(10) Patent No.: US 6,188,029 B1
(45) Date of Patent: Feb. 13, 2001

(54) WEIGHING APPARATUS HAVING IMPROVED HOPPER DETACHABILITY

(75) Inventors: Hideshi Miyamoto; Takashi Kimura, both of Shiga (JP)

(73) Assignee: Ishida Co., Ltd., Kyoto (JP)

( * ) Notice: Under 35 U.S.C. 154(b), the term of this patent shall be extended for 0 days.

(21) Appl. No.: 09/033,184

(22) PCT Filed: Jun. 6, 1997

(86) PCT No.: PCT/JP97/01968

§ 371 Date: Mar. 2, 1998

§ 102(e) Date: Mar. 2, 1998

(87) PCT Pub. No.: WO98/01727

PCT Pub. Date: Jan. 15, 1998

(30) Foreign Application Priority Data

Jul. 3, 1996 (JP) .................................................. 8 193964

(51) Int. Cl.[7] .......................... G01G 13/18; G01G 13/00; F16K 1/16; B67D 3/00; B60P 1/00

(52) U.S. Cl. ..................... 177/105; 177/108; 177/25.18; 251/303; 222/504; 222/556; 414/519

(58) Field of Search ........................... 251/303; 177/105, 177/106, 107, 108, 109, 110, 111, 112, 113, 25.18; 198/532; 222/556, 504; 414/519

(56) References Cited

U.S. PATENT DOCUMENTS

| 4,527,647 | * | 7/1985 | Ueda ..................................... 177/105 |
| 4,545,446 | * | 10/1985 | Kokabu .................................. 177/108 |
| 4,705,125 | * | 11/1987 | Yamada et al. ....................... 177/25.18 |
| 4,807,711 | * | 2/1989 | O'Brien et al. ...................... 177/25.18 |
| 5,324,894 | * | 6/1994 | Chen et al. ........................... 177/25.18 |
| 5,379,923 | * | 1/1995 | Sagastegui et al. ................... 222/503 |
| 5,810,327 | * | 9/1998 | Lutz ..................................... 251/303 |

* cited by examiner

*Primary Examiner*—Randy W. Gibson
(74) *Attorney, Agent, or Firm*—Hogan & Hartson, LLP (57) ABSTRACT

To simplify the structure of a hopper side of a weighing apparatus, brackets 24, 34 are fitted to gates 22, 32 of pool hoppers 8 or weighing hoppers 9 and rollers 28, 38 are rotatably provided on extensions 24*a*, 34*a* thereof. On a body B side of the weighing apparatus, there are provided operating arms 44, 64 having a forked tip portion, and the rollers 28, 38 fitted to the body B side are engaged so as to be held by the operating arms 44, 64. When the operating arms 44, 64 are rocked about support shafts 43, 63, the gates 22, 32 of the hoppers 8, 9 are rocked about support shafts 25, 35 through the rollers 28, 38 to selectively open and close lower portion discharge openings 21*b*, 31*b*.

10 Claims, 6 Drawing Sheets

WEIGHING APPARATUS HAVING IMPROVED HOPPER DETACHABILITY

FIELD OF THE INVENTION

The present invention relates to a weighing apparatus wherein hoppers for receiving and discharging articles to be weighed can easily detachably mounted on the body of the weighing apparatus.

BACKGROUND ART

A combinational weighing apparatus generally used for automatically weighing, for example, various articles is provided with a plurality of weighing hoppers and is so configured as to perform a weighing of the articles which have been dispersedly supplied onto those weighing hoppers, as to perform a combinational calculatiion based on the weights measured by those weighing hoppers, as to subsequently determine a combination of combined sums which may fall within a permissible range with respect to a target weight, and as to discharge the articles only from one of the weighing hoppers which has given the combination so that an aggregation of the articles of a total weight falling within the permissible range. This type of weighing appratus may have a pool hopper disposed immediately above each of the weighing hoppers so that when the articles to be weighed are discharged from the weighing hoppers, articles to be weighed, which participate in the subsequent combination, can be immediately discharged from the pool hoppers onto the weighing hoppers.

As indicated above, this type of weighing apparatus is provided with a plurality of hoppers and, in such case, a hopper generally called a gated-type hopper is employed for each hopper. This gated-type hopper comprises, for example, a hopper body having a top opening upwardly and a bottom formed with a discharge port, and a gate for selectively opening and closing the discharge port at said bottom and is so configured that articles to be weighed which have been supplied through the top opening of the hopper body can be discharged from the bottom discharge port by selectively opening and closing the gate.

The selective opening and closure of the gate in the gated-type hopper of the type discussed above has hitherto been carried out by operating a link member fitted unitarily on the side of the hopper. In other words, the Japanese Examined Utility Model Publication No. 7-6502, for example, discloses the structure comprising a motor as a drive source, a cam mounted on a rotary shaft of the motor, an operating lever protruding outwardly from a side surface of the body of the weighing apparatus and drivingly associated with rotation of the cam so as to undergo a rocking motion, all provided on the side of the weighing apparatus, and a link member provided on the side of the hopper and connected with a gate. This hopper is fitted to the body of the weighing apparatus with the operating lever engaged with the link member so that the link member can be operated in response to the rocking motion of the operating lever to thereby selectively open and close the gate of the hopper. Also, the Japanese Laid-open Utility Model Publication No. 6-58328, for example, discloses the structure in which there is provided a push rod capable of being selectively advanced and retracted from the side of the body of the weighing apparatus so that a link member provided on the side of the hopper and connected with the gate can be operated by this push rod to selectively open and close the gate.

However, in those prior art weighing apparatuses, although the drive motor and the operating lever or the push rod are provided on the side of the weighing apparatus, the link member operated by the operating lever or the push rod to selectively open and close the gate and a spring for biasing the gate towards a closed position are provided on the side of the hopper. Therefore, there have been problems in that not only does the entire structure of the hopper tend to become complicated, requiring time-consuming jobs of a routine inspection, a routine cleaning or detaching and mounting of the hopper to the body of the weighing apparatus, but also the number of component parts is increased accompanied by possible separation or loss of small component parts such as screws and the biasing spring. Also, where the structure is employed in which neither the link member nor the spring member is provided on the side of the hopper, the necessity of use of a lock means has arisen to lock the gate in the closed position so that the gate will not open during closure of the gate by the effect of the weight of the articles to be weighed that have been supplied to the hopper.

The present invention has been devised to substantially eliminate the above discussed problems and is intended to provide a weighing apparatus wherein the structure of the hopper is simplified to thereby improve the workability in detachment relative to the body of the weighing apparatus, the maintenance and the cleanliness, and wherein a mechanism for inhibiting the opening of the gate during closure of the gate is realized in a drive device on the side of the body of the weighing apparatus with a simple structure.

DISCLOSURE OF THE INVENTION

In order to solve the above discussed problem, a weighing apparatus according to the present invention comprises a hopper including a hopper body having an upper portion opening and a lower portion provided with a discharge opening and a gate drivingly provided in the hopper body for selectively opening and closing the discharge opening, and an apparatus body on which the hopper are detachably mounted, a drive device being provided on the apparatus body B for driving the gate of the hopper to selectively open and close the discharge openings of the hopper body. Said drive device includes a drive source, a transmission mechanism for transmitting a driving force of the drive source, and an operating member adapted to be driven by the driving force so transmitted by the transmission mechanism, said gate of the hopper being provided with engagement portion engageable with the operating member, said gate undergoing a rocking motion together with the engagement portion by the drive of the operating member to selectively open and close the discharge opening of the hopper. The transmission mechanism includes a spring for applying a biasing force to the operating member to cause the latter to operate in one of opening and closing directions of the gate and a converting mechanism for converting the driving force of the drive source into a power with which the operating member can operate in the other direction against the biasing force, said transmission mechanism, when the gate close the discharge opening of the hopper, preventing the operating member from being driven by an external force from a gate side to open the discharge opening.

According to the weighing apparatus of the present invention, in place of a link member of a complicated structure hitherto provided on the side of the hoppers and having a relatively large number of component parts, the gate of the hopper is provided with an engagement portion engageable with the operating member and rockable together with the gate, that is, an engagement portion which does not require a complicated structure such as the link member which has relatively rockable portions and, when the operating member is driven, the gate undergoes a rocking motion together with this engagement portion to thereby selectively open and close the discharge opening of the hopper and, therefore, the structure of the hopper can be simplified. As a result thereof, a job of mounting or detaching to or from the weighing apparatus body, the maintenance and the cleaning performance of the hopper can be improved.

Also, since when the gate is in position to close the discharge opening of the hopper body, the discharge opening will not be opened by an external force from the gate side, the possibility of the gate being opened under the influence of the weight of the articles to be weighed which have been supplied into the hopper can be avoided to thereby eliminate the inconvenience associated with fall of some of the articles to be weighed.

In a preferred embodiment of the present invention, the drive source and the transmission mechanism of the drive device are covered by a casing fitted to the apparatus body and the transmission mechanism within the casing and the operating member outside the casing are connected with each other through a support shaft extending through wall of the casing. With this structure, the drive motor and the transmission mechanism which is relatively complicated in structure are covered by the casing and are therefore protected from water and dusts.

In the weighing apparatus of the present invention, as a specific structure of the transmission mechanism for preventing the operating member from being driven by an external force from a gate side which tends to open the discharge opening of the gate, arrangement may be made so that the spring applies a biasing force to the converting mechanism in a direction required to operate the operating member to open the gate, so that the converting mechanism upon receipt of the driving force of the drive source operates the operating member at all times against the biasing force in a direction required to close the gate. Alternatively arrangement may be made that the spring applies a biasing force to the converting mechanism in a direction required to operate the operating member to close the gate, so that the converting mechanism upon receipt of the driving force of the drive source operates the operating member at all times against the biasing force in a direction required to open the gate and there is provided a link member which is brought to a halt at the gate closed position past a pondering point.

In a preferred embodiment of the present invention, the drive device includes a single drive source, a plurality of transmission mechanisms for transmitting the driving force of the drive source independently relative to each other, and a plurality of operating members adapted to be driven by the driving forces transmitted from the transmission mechanisms, respectively, and the hoppers are provided for each of the operating members.

According to this structure, since the selective opening and closing of the plural hoppers can be accomplished independently relative to each other by the single drive source, it is possible that pairs of upper pool hoppers and lower weighing hoppers having different opening or closing timings can be handled with the same and single drive source.

In a different embodiment of the present invention, the hopper and the transmission mechanism and the operating member of the drive device are loaded, as a tare weight, on a load detecting means for detecting the weight of a load, and when the gate is in position to close the discharge opening of the hopper body, the drive source of the drive device is disengaged from the transmission mechanism.

According to this structure, the hopper and the transmission mechanism and the operating member of the drive device are loaded as a tare weight on the load detecting means and the drive source will not be loaded as a tare weight and, therefore, the tare weight can be minimized to avoid increase of the load detecting means. Also, at the time of load detecting condition with the gate closing the discharge opening of the hopper body, the drive source which is not regarded as a tare weight and the transmission mechanism which is regarded as a tare weight are separated from each other, wherefore an external disturbance resulting from operation of the drive source will not be transmitted to the load detecting means to thereby ensure a high weighing accuracy with the tare weight fixed.

In the present invention, where the hopper is employed in two positioned one above the other, arrangement may be made that a first casing for covering the drive source, the first transmission mechanism and a portion of the second transmission mechanism is mounted on the apparatus body and a second casing for covering the other portion of the second transmission mechanism is mounted on the first casing. With this structure, as compared with the use of a single, relatively large casing covering the entire drive device, the use of the two small casings is sufficient and, therefore, the entire apparatus can be downscaled.

The present invention can be applied to a combinational weighing apparatus. In such case, the combinational weighing apparatus includes a plurality of weighing hoppers, a pool hopper for supplying articles to be weighed onto each of the weighing hoppers, and a load detecting means for detecting the weight of the articles within the weighing hoppers and operates to perform a combinational calculation of weights of the articles within the weighing hoppers to select a combination of the weighing hoppers which give combined sums which fall within a permissible range.

In such combinational weighing apparatus, it is preferred that one of the pool hoppers and one of the weighing hoppers positioned immediately below such one of the pool hoppers forms a pair of hopper and that the drive device includes, for the pair of the hoppers, a drive source, a plurality of transmission mechanisms for transmitting driving forces of the drive source independently relative to each other, and a plurality of operating members adapted to be driven by the driving force so transmitted by the transmission mechanisms to selectively open and close the gates of the hoppers. According to this structure, with the single drive source, it is possible to upper and lower pairs of pool hoppers and weighing hoppers having different opening or closing timings can be handled with the same and single drive source.

BEST MODE FOR CARRYING OUT THE INVENTION

Hereinafter, one preferred embodiment of the present invention will be described with reference to the accompanying drawings.

Figure 1:
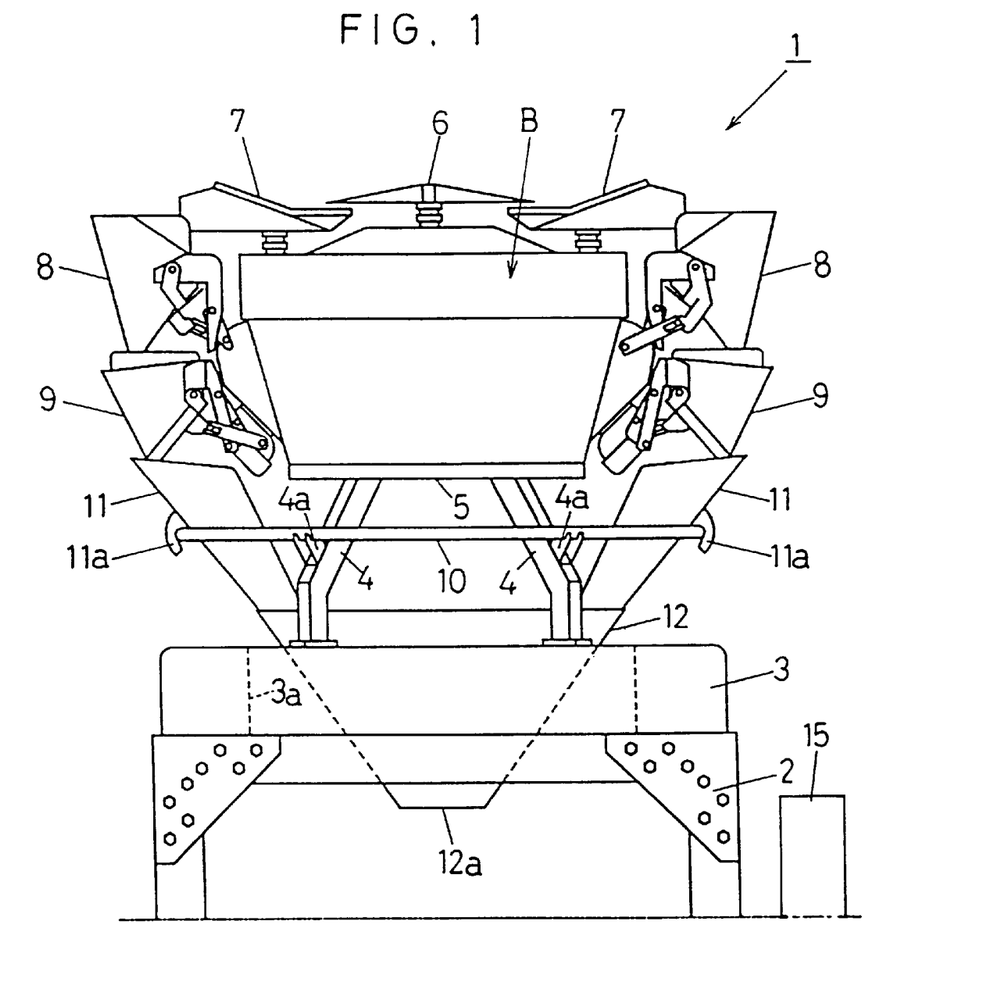
FIG. 1 is a schematic front elevational view showing the entire structure of a weighing apparatus according to an preferred embodiment of the present invention.

FIG. 1 is a schematic front elevational view of a weighing apparatus according to the present invention and, more particularly, the entire structure of a combinational weighing apparatus 1 of an automatic weighing type and a body B of this weighing apparatus includes a frame 2, a base 3, support legs 4 and a support table 5, wherein said base 3 having an opening 3a defined at a central portion thereof is mounted on the frame 2 and the support table 5 is supported on the base 3 through the support legs 4—4. A dispensing table 6 of a vibratory type and a plurality of troughs 7—7 of a vibratory type disposed radially around the dispensing table 6 are provided on a top surface of the support table 5, and a plurality of hopper pairs including upper and lower paired pool hoppers 8 and weighing hoppers 9 are provided around the support table 5, that is, adjacent the outer periphery of the body B in alignment with the respective troughs 7. With this structure, after articles to be weighed (not shown) supplied onto the dispensing table 6 have been dispersedly supplied into the troughs 7, the articles to be weighed are supplied through the pool hoppers 8 onto the weighing hoppers 9 where the weight is measured by a weight detecting means (shown by 66 in FIG. 3) coupled with the respective weighing hopper 9 and a combination calculation is carried out by a control unit 15.

A ring member 10 is fitted to the support legs 4 by means of a plurality of brackets 4a secured to the respective support legs 4, and individual chutes 11—11 equal in number to the number of the weighing hoppers 9 are engaged to corresponding hooks 11a —11a at respective locations below the weighing hoppers 9 to thereby form a collective chute as a whole. Within the central opening 3a in the base 3, a funnel-shaped discharge chute 12 is positioned below the individual chutes 11 by means of associated fixtures (not shown). A combinational calculation means incorporated in the control unit 15 performs a combinational calculation of the weights of the articles to be weighed within the weighing hoppers to determine a combination of combined stuns which may fall within a permissible range with respect to a target weight, and then discharges the articles only from the weighing hoppers 9 which have given the combination. The articles so discharged are collectively discharged from a discharge port 12a at a lower end of the discharge chute 12 through the individual chutes 11 and the associated discharge chutes 12.

In such case, each individual chutes 11 has its lower end mounted on an upper edge of the discharge chute 12 and pivots about a fulcrum, which is defined by a point of engagement between the ring member 10 and the associated hook 11a, in response to change of the fitting position of the discharge chute 12 in a vertical direction, so that the angle of inclination thereof can be changed freely. It is to be noted that in FIG. 1, only two of the troughs 7, two pool hoppers 8, two weighing hoppers 9 and two individual chutes 11, positioned on left and right portions of the drawing, are shown.

Figure 2:
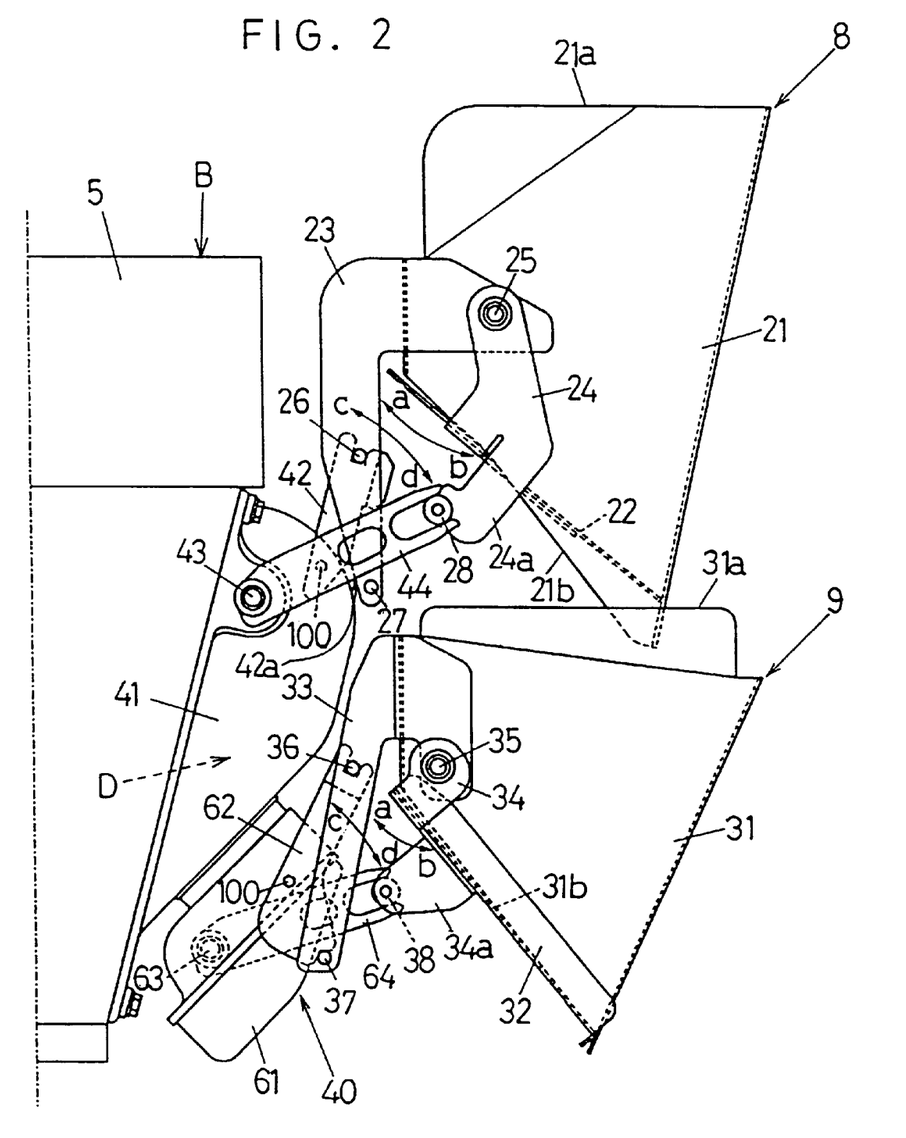
FIG. 2 is an enlarged view showing a hopper mounting portion of the weighing apparatus.

Hereinafter, the structure of each of the pool hopper 8 and the weighing hopper 9 will be described. As shown in FIG. 2, each of the pool hoppers 8 and the weighing hoppers 9 used in this weighing apparatus 1 is of a gated-type hopper including a horizontally polygonally sectioned hopper body 21, 31 having an upper opening 21a, 31a and a lower discharge opening 21b, 31b, and a gate 22, 32 for selectively opening or closing the lower discharge opening 21b, 31b of the hopper body 21, 31. Pairs of mounting brackets 23, 23; 33, 33 for mounting the hopper bodies 21, 31 on the support table 5 are, although only an upper front member thereof is shown in the drawing, provided in the hopper bodies 21, 31 in face-to-face relation with each other whereas the gates 22, 32 referred to above are provided with connecting brackets 24, 34 for connecting the gates 22, 32 with the respective hopper bodies 21, 31. And, these connecting brackets 24, 34 are mounted on the respective hopper bodies 21, 31 through the mounting brackets 23, 33 for rotation about support shafts 25, 35, and the gates 22, 32 can selectively open and close the lower discharge openings 21b, 31b of the hopper bodies 21, 31 when the connecting brackets 24, 34 are rotated about the support shafts 25, 35 in respective directions shown by the arrows a and b.

On the other hand, a peripheral surface of the support table 5 is provided with upper and lower casings 41 and 61, respectively of each hopper unit 40 as will be described later, and pairs of support brackets 42, 42; 62, 62 formed to a predetermined shape are, although only one member of each pair is shown in the drawing, provided in the casings 41, 61 in face-to-face relation with each other and a bolt 42a is embedded in a position generally intermediate between the support brackets 42, 42 of the upper casing 41 (See FIG. 3). And, upper and lower shaft members 26, 27; 36, 37 extend between the mounting brackets 23, 23; 33, 33 of each of the pool hoppers 8 and the weighing hoppers 9, and of them the three shaft members 26, 36 and 37 are engaged to the support brackets 42, 62 and the shaft member 27 is held in abutment with ahead of the bolt 42a wherefore the pool hoppers 8 and the weighing hoppers 9 are detachably mounted on the support table 5 through the first and second casings 41, 61 positioned one above the other.

Further, referring to FIG. 2, extensions 24a, 34a are formed on front sides of the connecting brackets 24 of the gates 22 of the pool hoppers 8 and opposite sides of the connecting brackets 34 of the gates 32 of the weighing hoppers 9,respectively, and rollers 28, 38, which serve as engaging portions, are rotatably provided on those extensions 24a, 34a. In correspondence therewith, operating arms 44, 64 capable of being rocked about support shafts 43, 63, respectively, are similarly provided on front sides of the first (upper) casings 41 and opposite sides of the second (lower) casings 61, respectively, with their tip portions engaging the rollers 28, 38 to hold them. Accordingly, when the operating arms 44, 64 are rocked about the support shafts 43, 63 in respective directions shown by the arrows c and d, the gates 22, 32 can undergo a rocking motion together with the rollers 28, 38 in the directions a and b through engagement between the operating arms 44, 64 and the rollers 28, 38, to thereby cause the lower discharge openings 21b, 31b of the hopper bodies 21, 31 to be selectively opened and closed. It is to be noted that the arrows a and b, the arrows c and d and arrows e and f as will be mentioned later are for the purpose of illustration of the direction of rocking and are not used to show the range of rocking.

Hereinafter, the structure of the hopper units 40 fitted to the peripheral surface of the support table 5, including drive mechanisms for the operating arms 44, 64 will be described.

Figure 3:
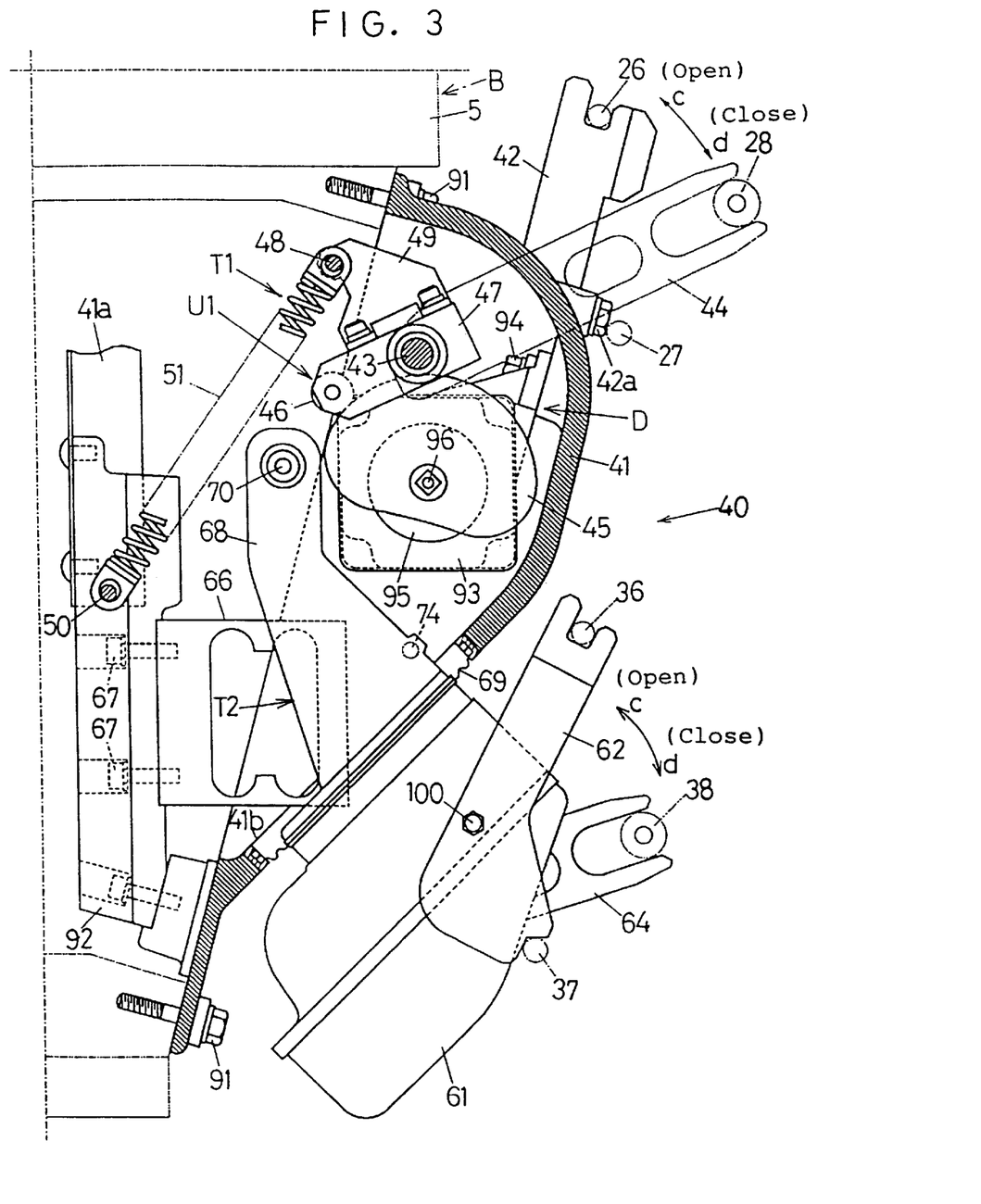
FIG. 3 is a longitudinal sectional view of a hopper unit mainly showing an open/closure operating mechanism of a pool hopper used in the weighing apparatus.
Figure 4:
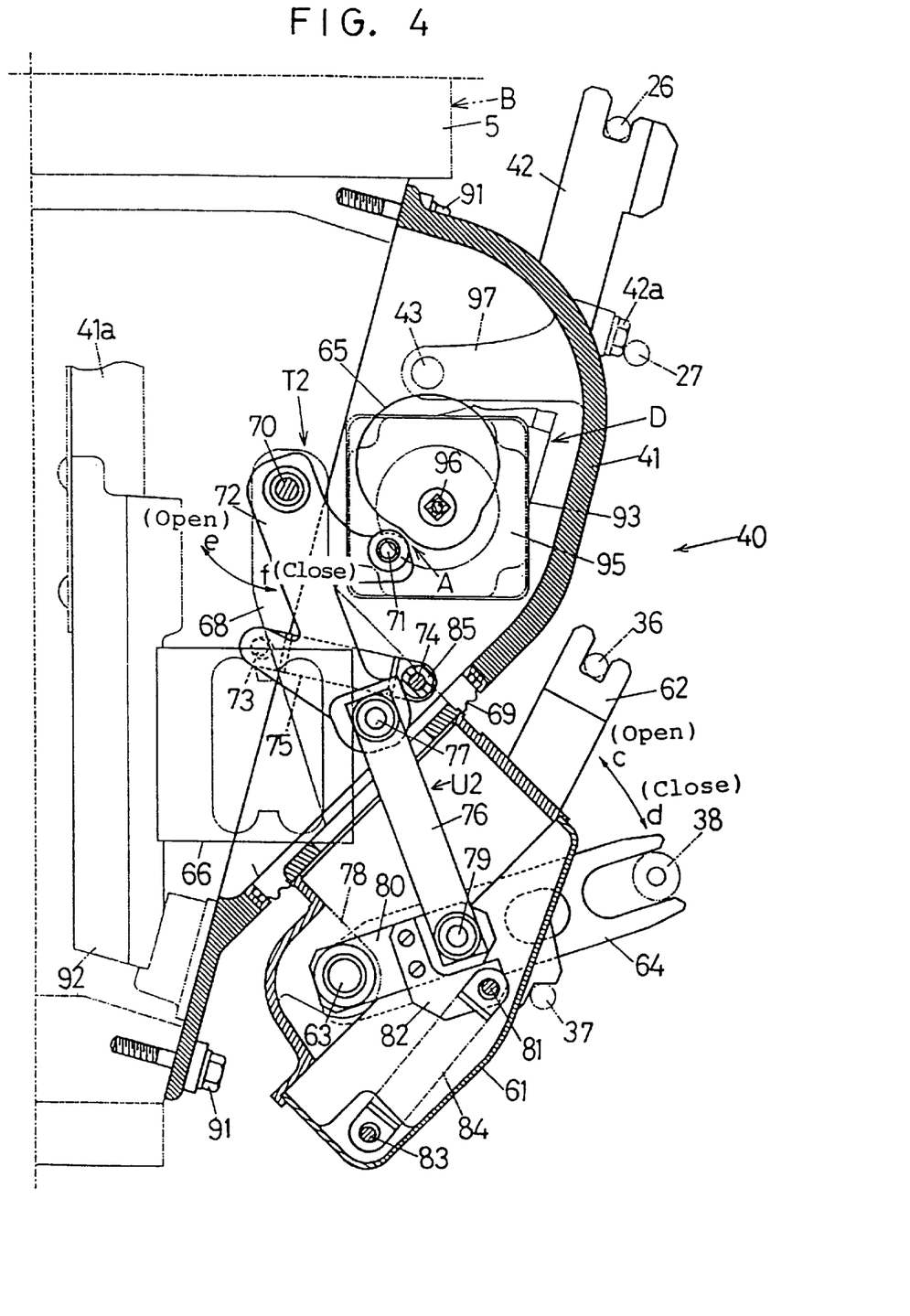
FIG. 4 is a longitudinal sectional view of the hopper unit mainly showing an open/closure operating mechanism of a weighing hopper used in the weighing apparatus.

FIGS. 3 and 4 are longitudinal sectional views in which of the hopper units 40, the upper operating arms 44 for selectively opening and closing the pool hoppers 8 or the lower operating arms 64 for selectively opening and closing the weighing hoppers 9 and their associated drive mechanisms are mainly shown. The hopper units 40 includes a drive device D having a drive source 95, a transmission mechanism T1, T2 as will be described later and the above described operating arms 44, 64, the above described casings 41, 61 and the hoppers 8, 9. The upper casings 41 are of a shape having an upper portion bulged outwardly and a lower portion formed into an inclined surface, and are fixed to the support table 5 by means of a plurality of bolts 91 through peripheral flanges, and base members 92 are secured to the inner peripheral surface of a lower flange portion so as to extend generally vertically therefrom, with said base members 92, although not shown in detail, further fixed to mounting frames 41a for connecting them with the upper casings 41.

Figure 5:
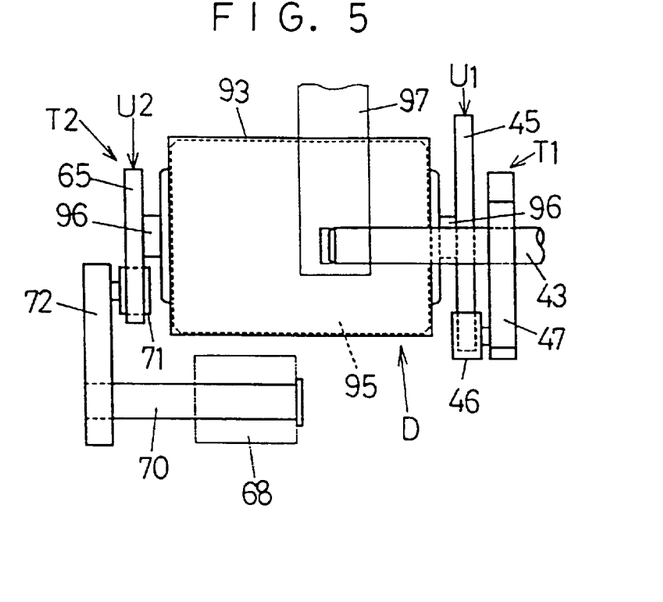
FIG. 5 is a schematic plan view showing the structure of a drive motor and its associated parts in the open/closure operating mechanism.

Also, a motor housing 93 is fitted to an inner surface of the outwardly bulged upper portion by means of a bolt 94 with a drive motor 95 accommodated inside the housing 93. A drive force of this drive motor 95 is transmitted to the operating arms 44, 64 through first and second transmission mechanisms T1 and T2 in a manner as will subsequently be described. The drive motor 95 and base end portions of the first and second transmission mechanisms T1 and T2 on one side adjacent the drive motor 95 are covered by the upper casing 41 while a tip portion of the second transmission mechanism T2 on one side adjacent the operating arm 64 is covered by the lower casing 61. A rotary shaft 96 of the drive motor 95 extends in a direction towards opposite ends thereof as shown in a plan view of FIG. 5 with first and second cams 45 and 65, respectively of a predetermined profile being coupled therewith.

Furthermore, a shaft support member 97 is formed so as to extend upwardly from the inner surface of the previously described bulged portion of the upper casing 41, and the support shaft 43 is rotatably supported by this support member 97 and a front wall surface of the casing 41 not shown in FIG. 3. And, the upper operating arm 44 is fixed to an outwardly extended end of the support shaft 43 by means of, for example, a pin and a block body 47 including a cam follower 46 movable along the first cam 45 is similarly fixed to the support shaft 43 within the casing 41. In this way, the transmission mechanism T1 within the casing 41 and the operating arm 44 positioned outside the casing 41 are connected with each other through the support shaft 43 which is supported having extended through the wall of the casing 41.

And, a bracket 49 formed with a pin 48 so as to extend outwardly therefrom is fitted to the block body 47, a spring 51 is suspended between this pin 48 and a pin 50 formed on the base member 92 so as to extend outwardly therefrom, and by this spring 51 the block body 47 and the operating arm 44 are biased at all times in a direction shown by the arrow c, that is, in such a direction as to open the pool hopper 8, and at the same time, the cam follower 46 disposed on the block body 47 at a portion opposite to an engaging portion between the operating arm 44 and the roller 28 with respect to the support shaft 43 is held at all times in condition biased towards the first cam 45.

In this way, the cam 45 rotates by the drive motor 95 and when the lift of the cam follower 46 increases, the operating arm 44 undergoes a rocking motion against the biasing force of the spring 51 in a direction shown by the arrow d, that is, in such a direction as to close the pool hopper 8. Conversely, when the lift of the cam follower 46 decreases, the operating arm 44 undergoes a rocking motion by the action of the biasing force of the spring 51 in a direction shown by the arrow c, that is, in such a direction as to open the pool hopper 8. Thus, while the spring 51 applies the biasing force so as to cause the operating arm 44 to be rocked in a gate opening direction c, the transmission T1 converts a rotary drive force of the drive motor 95 into an operation to cause the operating arm 44 to be rocked in the gate closing direction against the biasing force by means of a converting mechanism U1 including the cam 45 and the block body 47. And, in such case, when the pool hopper 8 is closed as a result of increase of the lift of the cam 45, the cam 45 assumes a top dead center position to support the cam follower 46 and will no longer move downwardly and, therefore, the rocking of the operating arm 44 in the direction of the arrow c is inhibited to lock the gate 22 of the hopper 8. Thereby, the possibility of the gate 22 being opened under the influence of an external force, such as, for example, the weight of the articles to be weighed which have been supplied into the pool hopper 8, acting on the closed gate 22 can be avoided to thereby eliminate the inconvenience associated with fall of some of the articles to be weighed.

Figure 6:
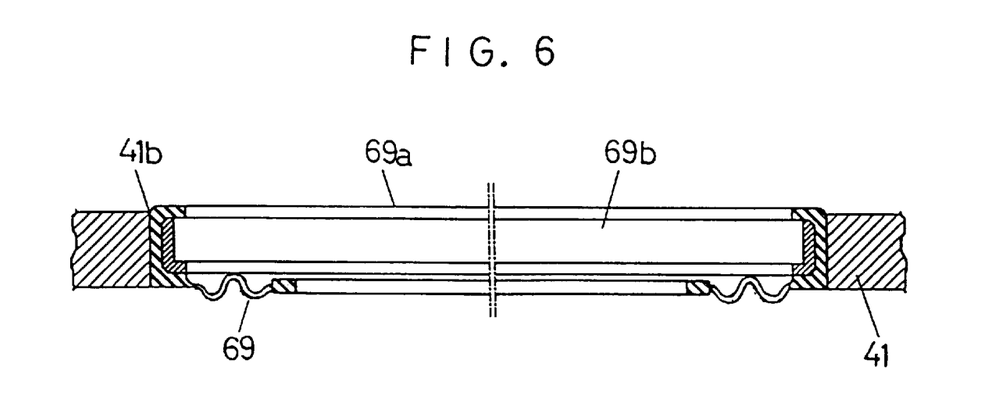
FIG. 6 is a longitudinal sectional view of a diaphragm used in the weighing apparatus.

Hereinafter, the structure on the side of the lower operating arm 64 will be described. This operating arm 64 is operable to selectively open and close the weighing hopper 9 by which the weight of the articles to be weighed can be measured, and a load cell 66 which serves as a load detector for weighing the weight of the articles to be weighed has one end fixed to the base member 92 by means of bolts 67. A support body 68 for supporting a link member 72 (FIG. 4) associated with a lower operating arm 64 as will be described subsequently is similarly fixed to a movable end portion, which is the opposite end of the load cell 66, by means of bolts not shown, and the support body 68 is fixed to a lower casing 61. In such case, a round opening 41b is formed in a lower inclined surface of the upper casing 41, through which opening 41b the lower casing 61 is fitted to the support body 68, and a diaphragm 69 for closing the opening 41b is sandwiched at a joint surface thereof. It is to be noted that the diaphragm 69 is of a type wherein, as shown in FIG. 6 on an enlarged scale, a ring portion 69a is integrally formed with a peripheral edge thereof and a core 69b is incorporated in the ling portion 69a, and is assembled in the upper casing 41 without using any screws and nuts, but merely pressure-fitting into the opening 41b.

A support shaft 70 is provided on an upper end portion of the support body 68 fitted to the load cell 66 of FIG. 4 and a first link member 72 having a cam follower 71 movable along the second cam 65 is rotatably supported on the support shaft 70, and a spring 75 is interposed between a pin 73, provided on the first link member 72, and a pin 74 provided on the support body 68, to urge at all times the cam follower 71 in a direction towards the second cam 65. In addition, a lower end of the first link member 72 has a second link member 76 connected thereto for rotation about a support shaft 77.

Also, a shaft support member 78 is formed inside the lower casing 61 so as to protrude outwardly, and the support shaft 63 is rotatably supported by this support member 78 and an opposite wall surface of the casing 61 in FIG. 4. The lower operating arm 64 is fixed to an outwardly protruding end of the support shaft 63, and a block body 80 rotatably connected with the second link member 76 by means of a support shaft 79 is similarly fixed to the support shaft 63 within the casing 61. In this way, a tip end portion of the transmission mechanism T2 within the casing 61 and the operating arm 64 outside the casing 61 are connected with each other through the support shaft 63 which is supported having extended through the wall of the casing 61.

The block body 80 is fitted with a bracket 82 having a pin 81 provided thereon so as to project outwardly therefrom, a spring 84 being interposed between this pin 81 and a pin 83, provided inside the casing 61, so that a biasing force of the spring 84 can be applied to the block body 80 and the operating arm 64 to urge the both about the support shaft 63 in a direction shown by the arrow d, that is, in such a direction as to close the weighing hopper 9.

Because of this, when the cam 65 is rotated by the drive motor 95 with the lift of the cam follower 71 consequently increased, the first link member 72 is rocked against the biasing force of the spring 75 in an opening direction shown by the arrow e and, in correspondence thereto, the block body 80 and the operating arm 64 are rocked against the biasing force of the spring 84 through the second link member 76 in the direction of the arrow c, that is, in such a direction as to open the weighing hopper 9. Conversely when the lift of the cam follower 71 decreases, the first link member 72 is rocked by the biasing force of the spring 75 in the closing direction shown by the arrow f and the block body 80 and the operating arm 64 are rocked by the biasing force of the spring 84 in the direction of the arrow d, that is, in such a direction as to close the weighing hopper 9. In this way, while the springs 75 and 84 apply the biasing forces required to rock the operating arm 64 in the gate closing direction d, the transmission mechanism T2 converts a rotary drive force of the drive motor 95 through the converting mechanism U2 including the cam 65, the link members 72 and 76, the block body 80 and so on, into an operation for rocking the operating arm 64 in a gate opening direction against the biasing forces.

In such case, when the lift of the cam 65 decreases with the weighing hopper 9 consequently closed, a lower end of the first link member 72 is brought into abutment with a pin 74 for connection with the spring 75 which is provided on the support body 68, more specifically, an elastic member 85 of rubber or the like wound around the pin 74, to thereby prevent the first link member 72 from being further rocked in the direction of the arrow f by the biasing force of the spring 75 and, at this time, as shown by A in FIG. 4, the cam follower 71 separates from the cam 65. In this way, at the time while the weighing hopper 9 is in an opened condition the articles to be weighed which have been supplied into the hopper 9 are measured, only the support body 68, the lower casing 61 fitted to the support body 68 and link members 72 and 76 and the operating arm 64 provided therein, the weighing hopper 9 fitted through the support brackets 62 and so on are loaded on the load cell 66 as a tare weight. Accordingly, the weighing accuracy can be secured without being adversely affected by an external factor brought about by the contact between the cam follower 71 and the cam 65, that is, an external factor resulting from an operation of the drive motor 95.

Also, when the lift of the cam 65 decreases similarly and the lower end of the first link member 72 is brought into abutment with the pin 74, the point of connection (support shaft) 77 between the first link member 72 and the second link member 76 is positioned having been moved in the direction of the arrow f past a so-called pondering point. Accordingly, when the weighing hopper 9 is in the closed position, even though an external force such as the weight of the articles to be weighed which have been supplied to such hopper 9 acts on the weighing hopper 9 to open the gate 32, the operating arm 64 is prevented from being rocked in the direction of the arrow c and the gate 32 of the weighing hopper 9 is locked and, therefore, there is no possibility of the gate 32 being opened and the problem associated with fall of the articles to be weighed can be avoided.

As hereinbefore described, the pool hopper 8 and the weighing hopper 9 in the weighing apparatus 1 are not provided with such link members for selectively opening and closing the gates 22 and 32 and such biasing springs for biasing the gates in the closing direction as required in the prior art, and are detachably mounted on the support table 5. Accordingly, when the hoppers 8 and 9 are removed from the support table 5, a simple structure can be obtained in which the gates 22 and 32 are freely fitted to the hopper bodies 21 and 31 through the support shafts 25 and 35 and not only can a detaching job be performed easily, but also a routine inspection and a routine cleaning can also be performed easily. Furthermore, the drive motor 95 and the transmission mechanisms T1 and T2 of the drive device D are covered by the casings 41 and 61 and are therefore protected from water and dusts.

It is to be noted that the first link member 72 rockable in the directions of the arrows e and f by the cam 65 and the cam follower 71 is connected with and spaced a distance from the block body 80 and the lower operating arm 64 through the long second link member 76 and, therefore, a rocking inertia force brought about by those members 80, 64 can be increased. Accordingly, even when the drive motor 95 is rotated particularly at a high speed, it is important that the cam follower 71 can be biased at all times towards the cam 65 against such a relatively large inertia force. In view of this, in the illustrated embodiment, the use has been made of the two springs 75 and 84 to assuredly permit the cam follower 71 to follow the cam 65, to thereby avoid any possible delay in closing of the weighing hopper 9.

Also, in the illustrated embodiment, the support brackets 42 and 62 fitted to the respective upper and lower casings 41 and 61 are, as shown in FIG. 2, supported at one point by means of fastening of, for example, bolts 100 . . . 100 with its inclination being adjustable. In addition, since the shaft member 27 of the pool hopper 8 is engaged with the head of the bolt 42a embedded in the upper casing 41, the position of the above described head can be changed by adjusting the amount to which the bolt 42a is embedded. With this structure, the height and the relation in arrangement of the pool hopper 8 or the weighing hopper 9 detachably engaged to the support brackets 42 and 62 can be adjusted.

In addition, the support brackets 62, 62 fitted to the lower casing 61 are engaged having been overhung over the shaft member 37 positioned downwardly of the weighing hopper 9. By this arrangement, the possibility of the weighing hopper 9 itself being floated upwardly when the operating arm 64 is rocked in the opening direction c can be avoided, allowing the gate 32 to be opened smoothly.

Figure 7:
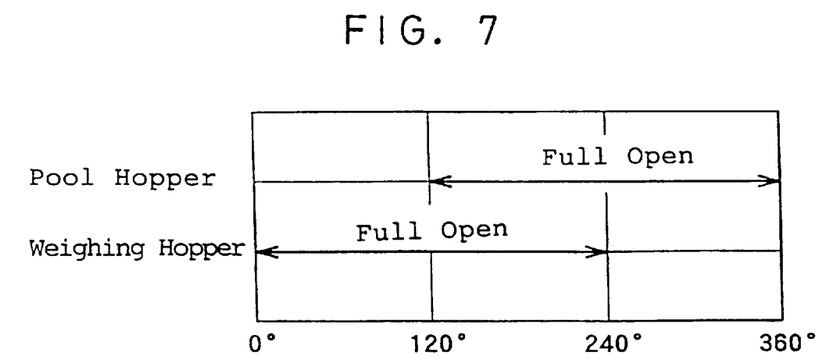
FIG. 7 is an explanatory diagram showing a timing between the pool hopper and the weighing hopper in the weighing apparatus.

In the following, to describe the layout angle of the first and second cams 45 and 65 is described. As shown in FIG. 7, the first and second cams 45 and 65 are arranged on the rotary shaft 96 so that during one complete rotation of the drive motor 95, the pool hopper 8 and the weighing hopper 9 can be opened. In such case, during rotation of the drive motor 95 through an angle of 0 to 240° the weighing hopper 9 is opened, followed by opening of the pool hopper 8 during rotation of the drive motor 95 through an angle of 120 to 360°.

Figure 8:
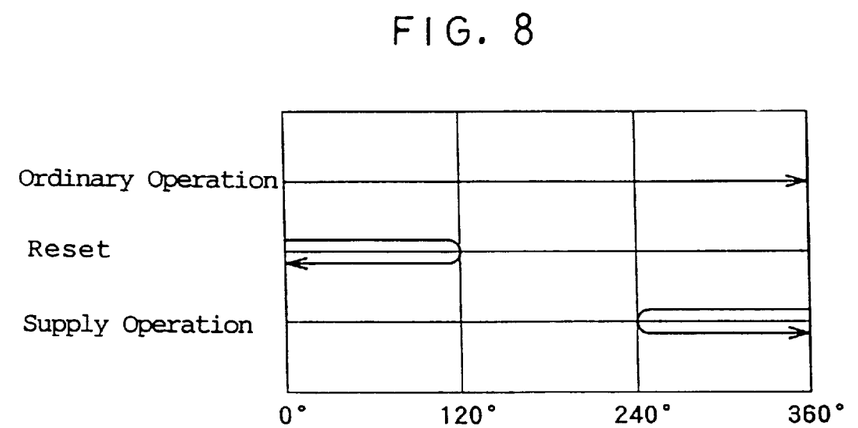
FIG. 8 is an explanatory diagram showing various operating modes of the weighing apparatus.

Accordingly, during an ordinary operating mode in which the articles to be weighed are discharged from the weighing hopper 9 which has given the result of the combinational calculation that matches with the permissible combination and the articles to be weighed which participate in the subsequent combination are supplied from the pool hopper 8, it is sufficient to cause the drive motor 95 to undergo one complete rotation as shown in FIG. 8. At this time, during the drive motor 95 being rotated through the angle of 120 to 240°, the opening operations by the two cams 45 and 65 overlap with each other and the pool hopper 8 can open before the weighing hopper 9 is closed completely and, therefore, a high speed feature of the weighing apparatus can be obtained.

On the other hand, during a reset in which the combination falling within the permissible range cannot be obtained and all the articles to be weighed are discharged from the weighing hopper 9, it is sufficient to cause the drive motor 95 to reciprocate over the angle of 0 to 120° and, where after the reset operation the articles to be weighed are supplied from all of the pool hopper 8 onto all of the weighing hoppers 9, it is sufficient to cause the drive motor to reciprocate over the angle of 360 to 240°.

INDUSTRIAL APPLICABILITY

The present invention is applicable equally not only to a combinational weighing apparatus provided with the plural weighing hoppers, but also to a weighing apparatus provided with one or a plurality of hoppers and capable of weighing the articles within the hoppers individually without combination calculation.

What is claimed is:

1. A weighing apparatus comprising:

a hopper including a hopper body having an upper portion opening and a lower portion provided with a discharge opening and a gate drivingly provided in the hopper body for selectively opening and closing the discharge opening;

an apparatus body on which the hopper is detachably mounted; and a drive device mounted entirely on the apparatus body for driving the gates of the hopper to selectively open and close the discharge opening of the hopper body, wherein said drive device includes a drive source, a transmission mechanism for transmitting a driving force of the drive source, and an operating member that is driven by the driving force so transmitted by the transmission mechanism T1, T2, wherein said gate of the hopper is provided with an engagement portion engageable with the operating member, wherein the drive device drives a rocking motion of the operating member through the transmission mechanism, and the rocking motion of the operating member drives a rocking motion of the gate through the engagement portion to selectively open and close the discharge opening of the hopper, and wherein the transmission mechanism includes a spring for applying a biasing force to the operating member to cause the operating member to operate in one of opening and closing directions of the gate, thereby opening and closing the gate and a converting mechanism for converting the driving force of the drive source into a power with which the operating member can operate in the other direction against the biasing force, said transmission mechanism, when the gate closes the discharge opening of the hopper, preventing the operating member from being driven by an external force from a gate side to open the discharge opening.

2. The weighing apparatus as claimed in claim 1, wherein the drive source and the transmission mechanism of the drive device are covered by a casing fitted to the apparatus body and the transmission mechanism within the casing and the operating member outside the casing are connected with each other through a support shaft extending through a wall of the casing.

3. The weighing apparatus as claimed in claim 1, wherein the spring applies a biasing force to the converting mechanism in a direction required to operate the operating member to close the gate and wherein said converting mechanism when receiving the driving force of the drive source operates the operating member at all times against the biasing force in a direction required to open the gate, to thereby prevent the operating member from being operated in the opening direction under the influence of an external force on a side of the gate having the tendency to open the discharge opening.

4. The weighing apparatus as claimed in claim 1, wherein the spring applies a biasing force to the converting mechanism in a direction required to operate the operating member to close the gate and wherein said converting mechanism when receiving the driving force of the drive source operates the operating member at all times against the biasing force in a direction required to open the gate, and includes a link member which stops at a gate closing position past a pondering point whereby the operating member is prevented from being operated in the opening direction under the influence of an external force on a side of the gate having the tendency to open the discharge opening.

5. The weighing apparatus as claimed in claim 1, wherein the drive device includes a single drive source, a plurality of transmission mechanisms for independently transmitting the driving force of the drive source, and a plurality of operating members each of which is respectively driven by the driving force transmitted by the corresponding transmission mechanism and wherein a hopper is provided for each of the operating members.

6. The weighing apparatus as claimed in claim 1, wherein the hopper, the transmission mechanism and the operating member of the driving device are loaded as a tare weight on a load detecting means for detecting the weight of a load, and wherein, when the gate is in position to close the discharge opening of the hopper body, the drive source of the drive device is disengaged from the transmission mechanism.

7. The weighing apparatus as claimed in claim 5, wherein a first casing for covering the drive source, a first transmission mechanism and a portion of a second transmission mechanism is mounted on the apparatus body and a second casing for covering the other portion of the second transmission mechanism is mounted on the first casing.

8. The weighing apparatus as claimed in claim 2, wherein the hopper body is supported within the casing.

9. The weighing apparatus as claimed in claim 1, further comprising:

a plurality of weighing hoppers:

a pool hopper provided for each weighing hopper for supplying articles to be weighed into the weighing hopper; and a load detecting means for detecting the weight of the articles within the weighing hoppers and being capable of performing a combinational calculation of weights of the articles within the weighing hoppers to select a combination of the weighing hoppers which give combined sums which fall within a permissible range.

10. The weighing apparatus as claimed in claim 9, wherein one of the pool hoppers and one of the weighing hoppers positioned immediately below such one of the pool hoppers form a pair of hoppers and wherein the drive device includes, for the pair of hoppers, a drive source, first and second transmission mechanisms for transmitting driving forces of the drive source independently relative to each other, and first and second operating members, that are driven by the driving force respectively transmitted by the first and second transmission mechanisms to selectively open and close the gates of the hoppers.

* * * * *